April 17, 1962     D. C. ROCKOLA     3,030,116
AUTOMATIC PHONOGRAPH

Filed Oct. 23, 1959     4 Sheets-Sheet 1

Inventor:
David C. Rockola
By: Horton, Davis, Brewer & Brugman
Attys.

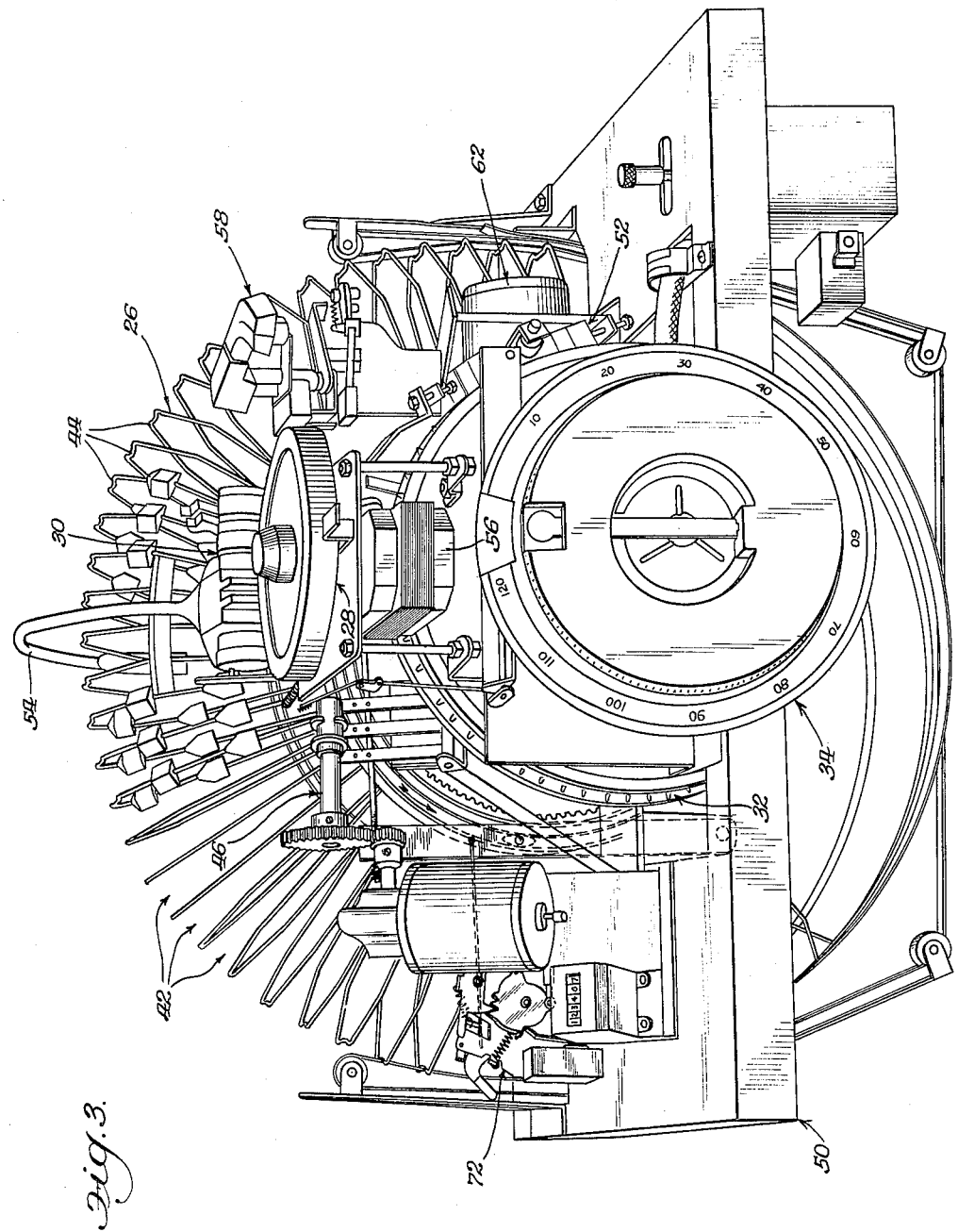

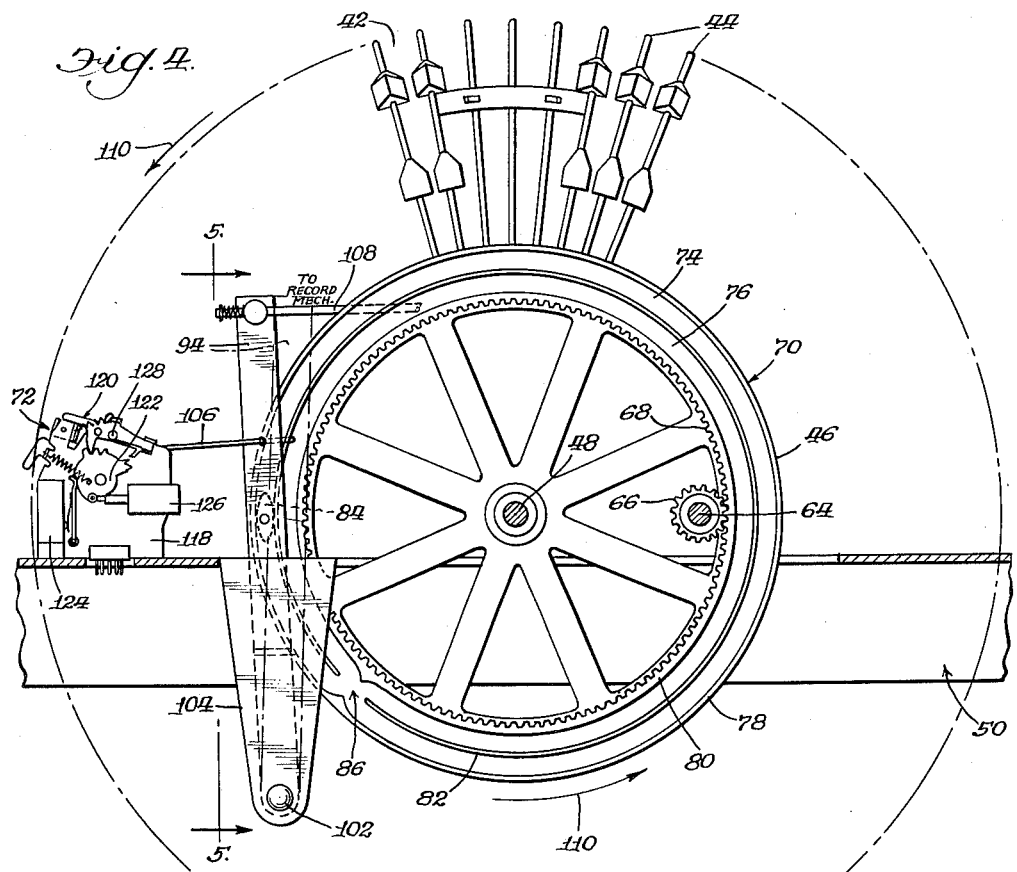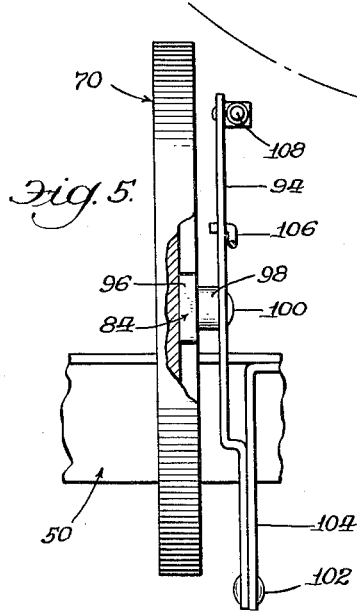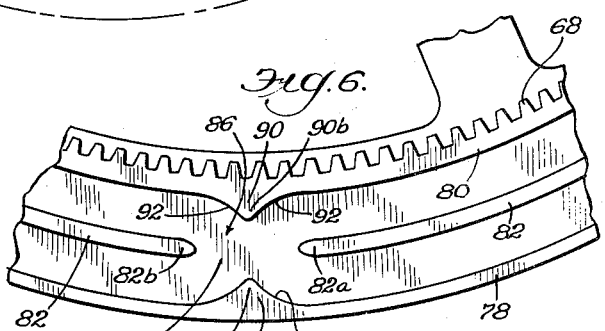

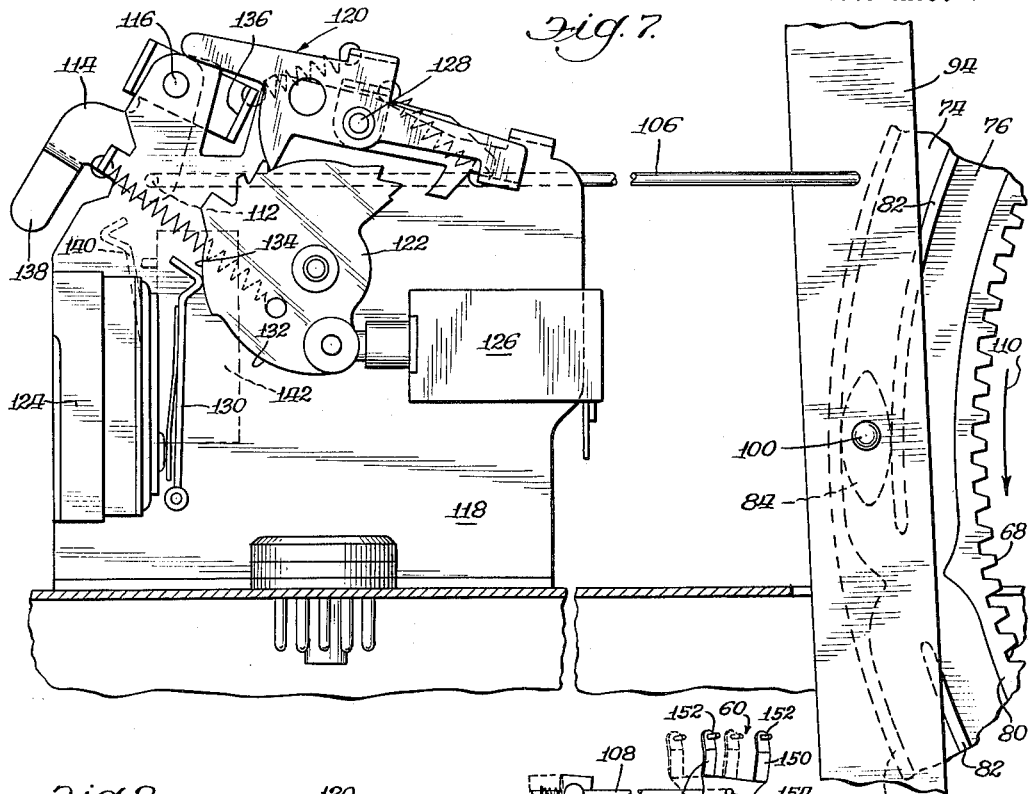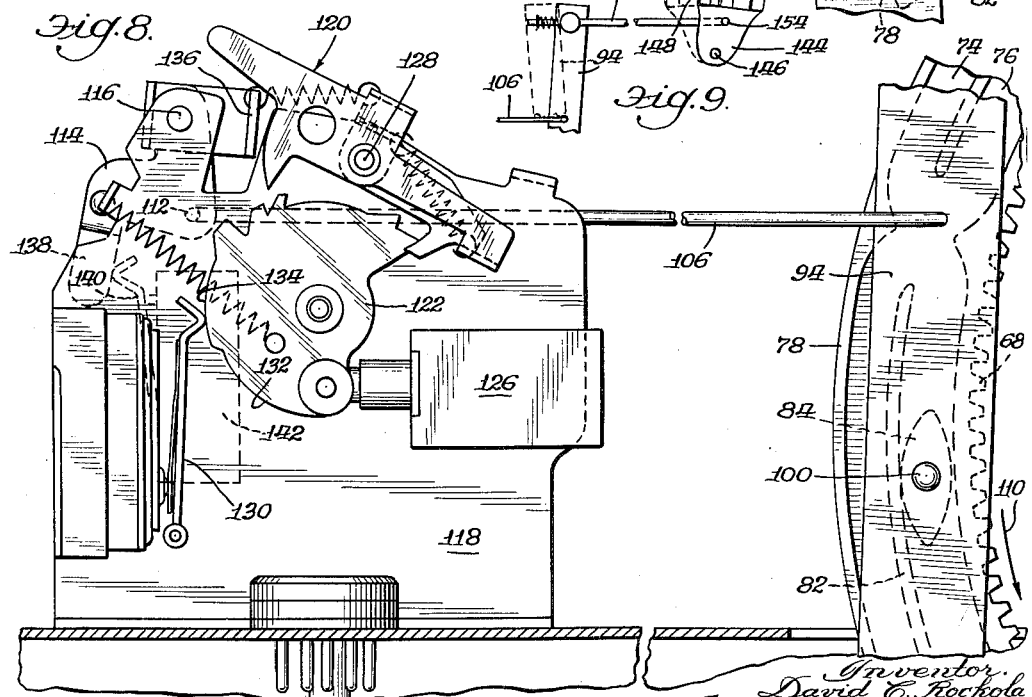

United States Patent Office 3,030,116
Patented Apr. 17, 1962

3,030,116
AUTOMATIC PHONOGRAPH
David C. Rockola, Chicago, Ill., assignor to Rock-Ola Manufacturing Corporation, Chicago, Ill., a corporation of Delaware
Filed Oct. 23, 1959, Ser. No. 848,373
7 Claims. (Cl. 274—10)

The present invention relates to automatic phonographs.

The invention relates more particularly to a novel operation of a record magazine in an automatic phonograph, and control means actuated thereby which operate to control the record magazine itself as well as to perform other functions.

In general, automatic phonographs include a record magazine movable through a predetermined range in a scanning cycle for the purpose of making selections of records in that magazine and playing those selected. It has been found most feasible to make selections of the obverse or reverse sides of the records in respective different portions of the scanning cycle, such for example as selecting the obverse sides in a first portion of the cycle and the reverse sides in a succeeding portion of the cycle. Further, it has been found most feasible to provide for movement of the record magazine in rotary direction rather than in rectilinear direction so as to provide maximum capacity for records in any given space, in view of the fact that such a magazine requires no greater space for movement than it does when stationary.

In the case of a rotary record magazine the movements above referred to in the scanning cycle are rotations, a first rotation being utilized for selecting the obverse sides and the second rotation for selecting the reverse sides. Heretofore automatic phonographs involved an arrangement for reversing the direction of rotation of the rotary magazine at the completion of each rotation. Certain difficulties and objections were encountered in this arrangement which the present invention overcomes.

A broad object of the present invention is to provide an automatic phonograph having a rotary record magazine in which the magazine rotates in a single direction in the scanning cycle which includes a plurality of rotations.

Another object of the invention is to provide an automatic phonograph having a unidirectionally rotatable record magazine arranged for making a plurality of rotations in a given scanning cycle wherein the record magazine rotates continuously, without cessation, through that scanning cycle, with attendant advantages of a shorter period required for the scanning cycle because of elimination of stopping the magazine, and less wear on the moving parts because of the elimination of inertia shock associated with repeated stopping and starting of the magazine and related parts.

Another and important object of the invention is to provide novel construction of mechanical parts and linkage cooperating with the movable record magazine, which are themselves actuated by the record magazine at the completion of each successive rotation, and which are utilized for actuating controls for controlling rotation of the record magazine as well as other operations.

A further and more specific object is to provide novel mechanical movements utilized in the mechanism just referred to, converting rotary movements of the record magazine to reciprocating movements in a control mechanism.

A still further and specific object is to provide mechanical movements of the character above referred to which includes a pair of concentric cam tracks and a follower therein which moves from the cam track in which it happens to be located, into the other, in alternately reversing directions, pursuant to successive unidirectional rotations of the cam track.

A further object is to provide means for converting unidirectional rotary movements to reciprocating movements utilizing a reciprocating member such as an arm for actuating a plurality of controls, including both mechanical and electrical.

Other objects and advantages of the invention will appear from the following detailed description taken in conjunction with the accompanying drawings in which:

FIG. 3 is a large scale perspective view of the major internal operating mechanisms of the phonograph, removed from the phonograph cabinet;

FIG. 4 is a front elevational view of the record magazine and certain associated parts;

FIG. 5 is a detailed view taken on line 5—5 of FIG. 4;

FIG. 6 is a large scale detailed view of a portion of the cam tracks shown in FIG. 4;

FIG. 7 is a view showing a portion of the cam tracks and follower in conjunction with a control mechanism actuated thereby;

FIG. 8 is a view similar to FIG. 7 but with certain operating parts in different positions; and FIG. 9 is a detailed view showing certain mechanical linkage controlled by the cam tracks and follower.

Figure 1:
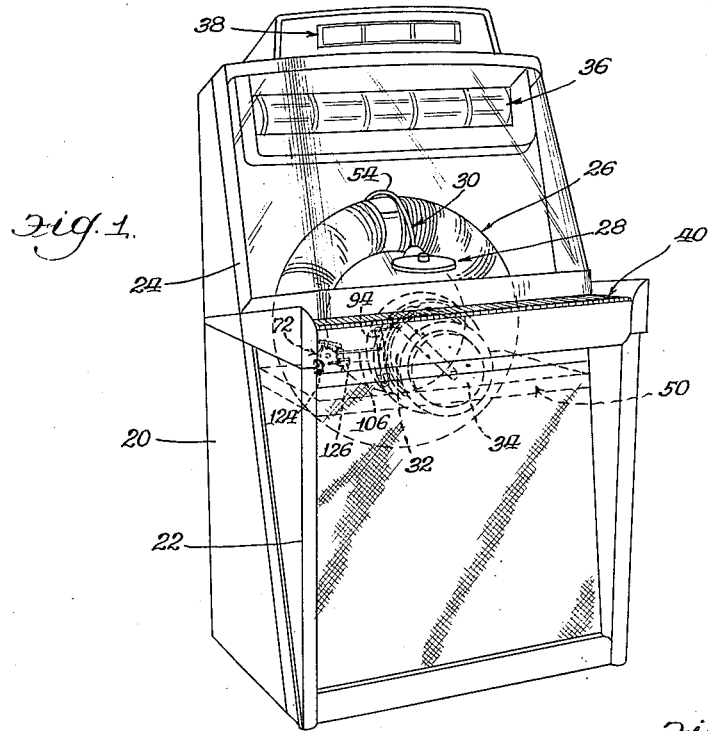
FIGURE 1 is a perspective view of the automatic phonograph, showing its exterior, and indicating certain major internal operating mechanisms.

Referring now in detail to the accompanying drawings, attention is directed first to FIG. 1 which is an overall view of an automatic phonograph to which the present invention is particularly adaptable. The phonograph as shown in FIG. 1 includes a cabinet 20 having front portions 22 and 24 movable to open positions for exposing the interior mechanism for accessibility to a serviceman. Normally these sections are closed in the position shown and locked, against opening by unauthorized persons.

The internal mechanisms shown and indicated in FIG. 1 include a record magazine 26, a turntable 28 and a record transferring and playing means indicated at 30 in FIG. 1, these mechanisms being described more fully in connection with FIG. 3. Also shown in FIG. 1 are a selector drum 32 and a popularity meter 34, these two latter instrumentalities also appearing in FIG. 3 and referred to again hereinbelow. Among the other members of the internal mechanism shown in FIG. 1 is a program holder 36 which does not enter into the present invention as such, but which is disclosed and claimed in my co-pending application Serial No. 839,725, filed September 14, 1959. All of the foregoing operating mechanisms are normally enclosed within the cabinet 20 against accessibility to the patron, but exposed to the exterior for operation by the patron are a plurality of group selector buttons 38 and a plurality of individual selector keys 40. As brought out in the co-pending application referred to above, records for use in automatic phonographs are classified into different groups according to the nature of the recordings which are identified by program tabs in the program holder which is rotated to selected positions for presenting the tabs of the selected group to view. The program holder is rotated to the selected positions in response to actuation of the group control buttons 38. Upon the program holder being rotated to the desired position, the patron then actuates one of the individual control keys 40, effecting playing of the desired record within the group selected.

Referring next to FIG. 3, the record magazine 26 includes a plurality of pockets 42 for receiving the records in the phonograph, formed by a plurality of radial wires or bails 44 which may be of any desired construction, such as U-shaped loops, secured in a hub member 46 (see particularly FIG. 4) by any suitable means. This record magazine is mounted for rotation on a shaft 48 suitably supported in the frame of the machine shown at 50 in FIG. 3. This record magazine is mounted for rotation, as noted, and, moreover, is arranged for rotation in a single direction so as to eliminate reversing operations, to great advantages referred to hereinbelow. Mounted on the same shaft 48 with the record magazine is the selector drum 32 which, however, is stationary but is scanned by a selector carriage 52 which is mounted on the end of an arm mounted on the shaft 48 for rotation therewith. The popularity meter 34 is also mounted on the shaft 48 for rotation therewith.

The general operation of playing the records is described in full in my prior United States Letters Patent No. 2,804,307, dated August 27, 1957. In general the record magazine 26 is rotated for positioning the desired record at an indexing position which in the arrangement illustrated is at the top where that record may be gripped by the record transferring and playing mechanism 30 which includes a gripper arm 54. The magazine is dynamically braked at the desired position, and in continuation of the playing operation the gripper arm 54 grips the record, removes it from the magazine and places it on the turntable 28. Thereupon the turntable motor 56 operates to turn the turntable, and the tone arm 58 is brought over into position for playing the record. Upon completion of the playing of the record, the tone arm is returned to its idle position and the record is returned to the magazine. The record, upon being placed on the turntable 28, is so placed with its obverse side or reverse side facing upwardly depending upon the position of the control member indicated in its entirety at 60 in FIG. 9, which in turn is controlled by the point in the scanning cycle and consequent cycle of rotation of the record magazine 26, all as brought out more fully hereinbelow. It may be stated at this point that the playing operation is such that in one rotation of the magazine in the scanning cycle, the obverse sides of the various records are played, while in the succeeding rotation the reverse sides are played. The single playing operation referred to above, i.e. the operation in which one record is played, may be followed by other similar operations depending upon the selections previously made.

Other mechanisms shown in FIG. 3 indicate a drive motor 62 utilized for driving the record magazine, being structurally arranged in any desired manner such as operating through a reduction gearing (not shown) having a drive transmitting shaft 64 (FIG. 4) on which a pinion 66 is secured meshing with an internal ring gear 68 on the hub means 40. Specifically, the ring gear 68 is formed on a ring 70 having cam tracks referred to above and described fully hereinbelow. Also included in the illustration of FIG. 3 is a scan control unit 72 shown and described fully in the co-pending United States Letters Patent application of John J. Toolan, Ser. No. 849,113 filed October 27, 1959, and which is actuated by the novel control means of the present invention in conjunction with actuation of the control member 60 of FIG. 9. The operation of the scan control unit 72 will be described below in connection wtih FIGS. 4, 7 and 8.

The playing of the records is simplified and facilitated by playing corresponding sides of all the records in one portion of the scanning cycle, and the corresponding opposite sides in a succeeding portion. In the present instance these portions are respectively single rotations of the record magazine, for example the obverse sides of the selected records being played in a first rotation of the magazine and the reverse sides in the succeeding rotation. In this way the setting of the transferring and playing means 30 for movement of the gripper arm 54 in the corresponding direction remains in a single position throughout a full rotation of the magazine, and is reversed only once for each rotation, assuming the opposite position in the second rotation. Heretofore rotary magazines were reversed in direction between these rotations of the scanning cycle with disadvantages and objections resulting therefrom. In the present instance the record magazine rotates in the same direction through all successive rotations, and moreover continues rotating without cessation between the separate rotations of the magazines, or in other words it constantly rotates throughout a predetermined cycle, which is always a plurality of rotations, and as noted in the Toolan application referred to above, is in the particular embodiment of the invention herein disclosed, a minimum of four rotations.

The mechanical mechanism for translating the rotary motion of the record magazine to reciprocating motion is shown generally in FIG. 4, with supplementary illustrations in FIGS. 2 and 5 to 8. Referring again to FIG. 4, the ring 70 includes outer and inner cam tracks or "canals" 74 and 76 respectively, defined by an outer wall element 78 and inner wall element 80 and an intermediate wall element 82, all of which may be integral, the ring thus being preferably a casting. These cam tracks open laterally from the ring and receive a cam track follower or "canal boat" 84 which travels in these cam tracks alternately in successive rotations of the magazine and hence of the ring 70, as brought out more fully hereinbelow. The ring and cam track arrangement includes a transfer or cross-over passage 86 shown in large scale in FIGS. 2 and 6, utilized for effecting transfer of the follower 84 from one cam track to the other in successive complete rotations of the magazine. This transfer passage, indicated generally at 88, is formed by a gap or interruption in the intermediate wall element 82, the adjacent ends of the wall element on opposite sides of the gap being identified as 82a and 82b for purposes of reference. The transfer or cross-over passage 86 is also partially defined by projections 90 formed in the outer and inner wall elements 78 and 80, respectively, and for convenience identified individually as 90a and 90b. These projections 90 are disposed on a common radius of the ring and project toward each other, in register with the ends of the gap 88 between the ends of the intermediate wall element 82. Each projection 90 is defined by curved surfaces 92 which are disposed respectively on leading and trailing sides of the points of the projections and are curved generally about centers located in the region of the associated ends 82a and 82b of the wall element 82. The ends 82a and 82b themselves also are curved in the same general direction as the surfaces 92, thereby defining continuation or linking passage portions from the outer cam track to the inner cam track, and in opposite direction from the inner cam track to the outer cam track, respectively. The details of the specific movements of the follower through the transfer passage are set out hereinbelow.

The follower 84 which rides in the cam tracks is pivotally mounted on a lever arm 94 and effects reciprocating movement of that lever arm. The follower 84 as shown in FIG. 5 includes a cam portion 96 and a hub portion 98, and is arranged with the cam portion in a cam track, with the hub portion 98 abutting the lever arm 94 and pivotally mounted thereon as by a pivot 100 in the usual manner. The lever arm 94 is pivotally mounted by means of a rivet 102 at its lower end on a bracket 104 which is a fixed element of the machine, being, for example, secured to the frame 50. The lever arm 94 extends upwardly and has a link 106 pivoted at one end thereon with its other end pivotally secured to a member of the scan control unit 72 and referred to more particularly in connection with FIGS. 7 and 8. Also connected with the lever arm 94, adjacent its upper end, is another link 108 having its opposite end connected to the control member 60 shown in FIG. 9. Upon reciprocating movements of the lever arm 94, the scan control unit 72 and the control member 60 are moved alternately to opposite positions pursuant to successive rotations of the record magazine as controlled by the cam tracks and follower, as described in detail hereinbelow.

Figure 2:
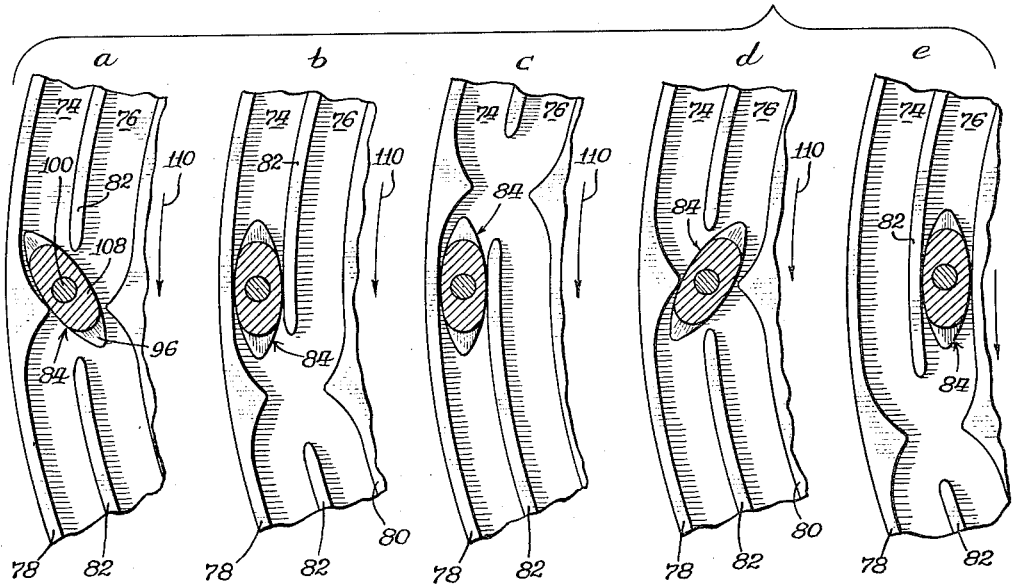
FIG. 2 is a detailed view showing a series of different positions of a portion of the cam tracks and follower.

Reference is next made to FIG. 2 showing different positions of the cam track follower in the cam tracks. This figure includes a plurality of views of the same portion of the cam tracks, and the follower, to show the detailed movements in the transfer of the follower to opposite cam tracks in the successive rotations of the magazine. The cam track ring 70 rotates in counterclockwise direction as indicated by the arrow 110, as determined by the same direction of rotation of the magazine as indicated by the arrow in FIG. 4. The follower 84 as viewed axially is of double convex form, its lateral surfaces converging to form relatively pointed leading and following ends. Assuming a starting position as shown in FIG. 2a, the follower 84 is positioned at least partially in the transfer passage 86, but with its leading end entering into the outer cam track 74. It will be understood that circumferential movements between the cam track ring 70 and the follower 84 are relative, the follower remaining in a fixed location while the cam track ring rotates. Upon this movement beginning from the position of FIG. 2a the leading pointed end of the follower engaging the outer wall element 78 rotates on its axis in clockwise direction to the position shown in position b, whereupon it is confined between the outer wall element 78 and the intermediate wall element 82. It remains in this outer cam track throughout the next substantially complete rotation to the position shown at c where the leading end of the follower is approaching the curved surface 92 of the outer projection 90a. Upon continued movement of the cam track ring from the position c to the position d, engagement of the leading end of the follower with the curved surface mentioned swings the leading end of the follower to the right and it enters into the inner cam track 76, being confined against swinging in the opposite direction by the ends 82b and 82a of the intermediate wall element engageable by the leading and trailing pointed ends of the follower, respectively. Continued rotation of the cam track ring 70 from position d to position e constrains the follower to move into the inner cam track 76 as shown at position e, and it remains in that cam track throughout the next substantially complete rotation of the cam track ring, until it reaches the position just before that shown at position a. The cycle of movement of the follower is thus completed, moving from the outer cam track to the inner, and from the inner to the outer.

These movements of the follower between the cam tracks as just described result in reciprocating movements of the lever arm 94 about the axis of the pivot means 102 with control functions corresponding thereto. With respect to the mechanisms controlled by this reciprocating lever arm, reference is made first to the scan control unit 72 particularly as shown in FIGS. 7 and 8. The alternate positions of the lever arm 94 are shown in full and dot-dash lines respectively (FIG. 4) and in response to the movements of this lever arm the link 106 is reciprocated. The link 106 has its opposite end pivotally connected at 112 to a member 114 which is pivotally mounted at 116 on a fixed element of the unit 72, such as a frame member 118. The connection at 112 is eccentrically disposed to the axis of pivoting movement of the member 114, the latter being indicated at 116, so that upon reciprocating movements of the link 106 the member 114 swings between its alternate positions shown respectively in FIGS. 7 and 8. These movements of the member 114 perform certain functions, one of which is to control a pawl 120 which acts as an escapement control means for a ratchet 122. This pawl and ratchet mechanism are shown and claimed in the Toolan application referred to above, but broadly stated, the function of the ratchet 122 is to close a switch 124 upon movement of the ratchet in advancing direction which is counterclockwise, being moved in that direction by a solenoid 126. The pawl 120 is mounted for oscillating movement about the pivot means indicated at 128 and in response to such movements, controls the ratchet 122 in its movement from advanced position to home position, these movements being in clockwise direction. Upon reaching its home position the lever arm 130 of switch 124 moves into a low point 132 of the ratchet member 122, being on the high point 134 at all other positions of the member 122, thereby controlling the condition of the switch 124. The pawl 120 in turn is controlled by a finger 136 on the member 114 which, in response to oscillating movements of the member 114, alternately engaging the pawl and swinging the latter as indicated in FIG. 8, and retracting therefrom and allowing the pawl to retract as indicated in FIG. 7. The member 114 has an extension 138 which engages an arm 140 of a switch 142 included in the scan control unit 72. Thus, upon reciprocating movements of the link 106, the switch 142 is directly actuated and controlled and the switch 124 is controlled through the medium of the pawl 120 and ratchet member 122.

The control member 60 shown in FIG. 9 and referred to above is for the purpose of controlling the record transferring and playing means 30, and more particularly the gripper arm 54, so as to control the latter for placing the obverse or reverse side of the record on the turntable 28 according to the side selected. The member 60 and the controlling movements thereof are disclosed in my prior patent referred to above to which reference may be made for complete disclosure of its construction and operation, but generally the member 60 includes a base portion 144 pivotally mounted at 146 on a fixed portion of the machine and having a pair of arms 148 and 150 extending upwardly therefrom, each having a pin 152 at its upper end. The link 108 is pivotally connected with the base member 144, as indicated at 154, at a point spaced from the pivot means 146, and in response to reciprocating movements of the link 108 the member 60 is alternately swung between its opposite positions shown, one shown in full lines and the other in dotted lines. The gripper arm 54 has a pair of grooves or forked portions (not shown) for receiving a corresponding one of the pins 152, according to which position the member 60 assumes, these positions being mutually exclusive, i.e., only one of the pins can enter the corresponding groove or forked portion. These pins are so located as to swing the gripper arm 54 in one or the other direction from its position shown in FIGS. 1 and 3, a distance of 90°, for placing the one or the other side of the record upwardly on the turntable.

The control functions thus described, i.e., those exercised on the scan control unit 72 and the member 60, are provided by successive rotations of the record magazine in a single direction and without cessation of rotation thereof. In the one case, namely in connection with the scan control unit 72, the control exercised is through the pawl and ratchet means 120 and 122 for defining the length of the scanning cycle which may be four rotations or more, this function including control of the switch 124, and direct control of the switch 142, the operation of which is intermittent, being actuated independently at each single rotation of the magazine. The control thus exercised on the scan control unit 72 is of both mechanical and electrical nature. The control exercised on the control member 60 of FIG. 9 is of mechanical nature. These controls are accomplished through the unidirectional rotation of the record magazine and the mechanism for producing the reversing operations is extremely simple, accurate and effective.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the forms hereinbefore described being merely preferred embodiments thereof.

I claim:
1. In an automatic phonograph, a magazine having a plurality of record receiving pockets and rotatable in a single direction for selectively placing said pockets at an indexing position, means for driving said magazine, manually actuated means for initiating operation of said driving means, a turntable, means for transferring a record between a pocket at said indexing position and said turntable, said record transferring means being operable in each of opposite directions for placing a record in position on the turntable with a corresponding side thereof facing upwardly, a pivoted lever, means interconnecting said lever and magazine for movement of said lever in opposite directions in response to successive rotations in the same direction of said magazine, camming means positionable in each of opposite positions and thereby operable for controlling said record transferring means for operation in opposite directions in successive rotations of said magazine, means interconnecting said lever and camming means for said movement of the camming means by the lever, and means controlled by said controlling means for stopping said driving means pursuant to a predetermined number of rotations of said magazine.

2. The invention set out in claim 3, in which the interconnecting means includes cam track means on the magazine and a follower on the pivoted lever and further in which the follower moves between opposite positions relative to the cam track means in immediately successive rotations of the magazine in the same direction.

3. The invention set out in claim 2, in which the cam track means includes wall elements forming concentric cam tracks and defining a transfer passage between the tracks, and the wall elements have projections deflecting the follower from whichever track it happens to be in into the other track.

4. The invention set out in claim 3 in which the wall elements include outer and inner continuous elements and a central rib defining tracks on opposite sides of the central rib, and the central rib has an interruption forming said passage and the outer and inner well elements are provided with inwardly directed projections in register with said interruption.

5. The invention set out in claim 4 in which the ends of the central rib on opposite sides of the interruption are rounded and the projections on the outer and inner wall elements have concave surfaces curved about axes respectively in the regions of the axes of curvature of the ends of the central rib.

6. The invention set out in claim 5 in which the cam follower is double convex shape and has pointed leading and trailing ends.

7. In an automatic phonograph, a unidirectionally rotatable record magazine, driving means for rotating the magazine through a predetermined cycle for selectively positioning it, means for transferring records between the magazine and turntable, single means for playing records on the turntable, and means controlled by movement of the magazine for controlling said transferring means for placing opposite sides of a record upward on the turntable in immediately successive rotations of the magazine in the same direction for consequently playing opposite sides of a record in those successive rotations of the magazine.

References Cited in the file of this patent

UNITED STATES PATENTS

| | | |
|---|---|---|
| 303,317 | Ostrom | Aug. 12, 1884 |
| 2,776,336 | Claur | Jan. 1, 1957 |
| 2,796,263 | Moore | June 18, 1957 |
| 2,804,307 | Rockola | Aug. 27, 1957 |

FOREIGN PATENTS

| | | |
|---|---|---|
| 394,493 | Great Britain | June 29, 1933 |

UNITED STATES PATENT OFFICE
CERTIFICATE OF CORRECTION

Patent No. 3,030,116                       April 17, 1962

David C. Rockola

It is hereby certified that error appears in the above numbered patent requiring correction and that the said Letters Patent should read as corrected below.

Column 7, line 29, for the claim reference numeral "3" read -- 1 --.

Signed and sealed this 7th day of August 1962.

(SEAL)
Attest:

ERNEST W. SWIDER
Attesting Officer

DAVID L. LADD
Commissioner of Patents